(12) United States Patent
Asano et al.

(10) Patent No.: US 11,073,640 B2
(45) Date of Patent: Jul. 27, 2021

(54) OPTICAL DEVICE, IMAGE READING DEVICE, AND IMAGE FORMING APPARATUS

(71) Applicant: FUJIFILM BUSINESS INNOVATION CORP., Tokyo (JP)

(72) Inventors: Motohiro Asano, Kanagawa (JP); Masaki Hachisuga, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/515,224

(22) Filed: Jul. 18, 2019

(65) Prior Publication Data
US 2020/0310003 A1 Oct. 1, 2020

(30) Foreign Application Priority Data
Mar. 26, 2019 (JP) .............................. JP2019-058914

(51) Int. Cl.
| | | |
|---|---|---|
| *H04N 1/04* | (2006.01) | |
| *G02B 3/00* | (2006.01) | |
| *H04N 1/00* | (2006.01) | |
| *H04N 1/028* | (2006.01) | |
| *G02B 5/00* | (2006.01) | |

(52) U.S. Cl.
CPC ......... *G02B 3/0056* (2013.01); *G02B 3/0062* (2013.01); *G02B 5/003* (2013.01); *H04N 1/00997* (2013.01); *H04N 1/0282* (2013.01); *H04N 1/02895* (2013.01)

(58) Field of Classification Search
CPC .... G02B 3/0056; G02B 3/0062; G02B 5/003; G02B 5/005; H04N 1/00997; H04N 1/0282; H04N 1/02895
USPC ........................................ 358/482, 483, 512
See application file for complete search history.

(56) References Cited

U.S. PATENT DOCUMENTS

| | | | | |
|---|---|---|---|---|
| 6,163,414 A | * | 12/2000 | Kikuchi ................. | G02B 26/10 359/776 |
| 6,366,408 B1 | * | 4/2002 | Kittaka ................. | G02B 3/0056 359/619 |
| 6,707,613 B2 | * | 3/2004 | Fujimoto ................. | B41J 2/451 359/622 |
| 2003/0102365 A1 | * | 6/2003 | Elderfield .............. | G07C 9/257 235/375 |
| 2004/0057036 A1 | | 3/2004 | Kawashima et al. | |
| 2008/0031497 A1 | * | 2/2008 | Kishigami ......... | G06K 9/00033 382/115 |

(Continued)

FOREIGN PATENT DOCUMENTS

| | | |
|---|---|---|
| JP | 2004-111678 A | 4/2004 |
| JP | 2014102413 A * | 6/2014 |

*Primary Examiner* — Cheukfan Lee
(74) *Attorney, Agent, or Firm* — Oliff PLC

(57) ABSTRACT

An optical device includes: a lens member including a plurality of lenses arranged such that optical axes of the lenses are substantially parallel to one another; and a plurality of column parts that are each provided along the optical axis of each lens among the plurality of lenses and each allow light to pass through inside, each column part having an outer periphery through which light is less likely to pass from inside to outside the column part than through an end portion of the column part in a direction along the optical axis, the plurality of column parts being integrally formed and disposed to face the lens member.

11 Claims, 11 Drawing Sheets

(56) References Cited

U.S. PATENT DOCUMENTS

| | | | |
|---|---|---|---|
| 2008/0080046 A1* | 4/2008 | Yamamura | B41J 2/451 359/435 |
| 2008/0080057 A1* | 4/2008 | Yamamura | B41J 2/451 359/622 |
| 2008/0121788 A1* | 5/2008 | Kawada | G01D 5/34715 250/231.13 |
| 2008/0273255 A1* | 11/2008 | Yang | G02B 7/023 359/819 |
| 2009/0322847 A1* | 12/2009 | Yamamura | B41J 2/451 347/130 |
| 2010/0110009 A1* | 5/2010 | Wong | G06F 21/83 345/163 |
| 2010/0142057 A1* | 6/2010 | Nagata | G02B 3/0068 359/622 |
| 2010/0157429 A1* | 6/2010 | Yamamura | G02B 3/005 359/622 |
| 2010/0271705 A1* | 10/2010 | Hung | G02B 13/001 359/601 |
| 2010/0315718 A1* | 12/2010 | Nagata | G02B 3/005 359/622 |
| 2011/0038019 A1* | 2/2011 | Kawano | H04N 1/0306 358/475 |
| 2011/0043872 A1* | 2/2011 | Mamada | G02B 27/0961 358/474 |
| 2011/0096376 A1* | 4/2011 | Minobe | H04N 1/02815 358/482 |
| 2011/0134495 A1* | 6/2011 | Nagata | G02B 3/0062 358/474 |
| 2011/0280628 A1* | 11/2011 | Kim | G02B 3/0056 399/218 |
| 2012/0200899 A1* | 8/2012 | Ogi | G02B 3/0062 358/475 |
| 2012/0274993 A1* | 11/2012 | Yamamura | B41J 2/451 358/474 |
| 2013/0094091 A1* | 4/2013 | Kobayashi | H04N 1/0312 359/619 |
| 2013/0135694 A1* | 5/2013 | Yamamura | H04N 1/10 358/474 |
| 2014/0160573 A1* | 6/2014 | Teramura | G02B 3/0056 359/619 |
| 2015/0109676 A1* | 4/2015 | Kobayashi | G02B 3/005 359/619 |
| 2019/0206925 A1* | 7/2019 | Yamamoto | H01L 27/14685 |
| 2019/0229136 A1* | 7/2019 | Hayashi | G02B 5/005 |
| 2019/0257983 A1* | 8/2019 | Yamamura | G03G 15/0409 |
| 2019/0347462 A1* | 11/2019 | Tseng | G02B 27/30 |
| 2020/0310004 A1* | 10/2020 | Hachisuga | H04N 1/00997 |
| 2020/0333642 A1* | 10/2020 | Hachisuga | G02F 1/0311 |
| 2021/0029265 A1* | 1/2021 | Asano | G02B 3/0062 |

* cited by examiner

CIRCLE

MAIN SCANNING DIRECTION

SUB-SCANNING DIRECTION

SEMICIRCLE 0.75

SEMICIRCLE 0.6

LINE SEGMENT 0.18

OPTICAL DEVICE, IMAGE READING DEVICE, AND IMAGE FORMING APPARATUS

CROSS-REFERENCE TO RELATED APPLICATIONS

This application is based on and claims priority under 35 USC 119 from Japanese Patent Application No. 2019-058914 filed Mar. 26, 2019.

BACKGROUND

(i) Technical Field

The present disclosure relates to an optical device, an image reading device, and an image forming apparatus.

(ii) Related Art

JP-A-2004-111678 discloses an exposure method in which a pattern formed on a mask is illuminated by an illumination system that forms an effective light source having a first portion where only S polarization exists and a second portion where S polarization and P polarization exist, and light transmitted through the mask is projected on a workpiece via a projection optical system.

Meanwhile, for reducing stray light, a light shielding member that blocks passage of light passing through the lens may be provided to face a lens member including plural lenses arranged such that optical axes are parallel to each other. Such a light shielding member is also known to have a structure having a light-passing through-hole on a position corresponding to each lens. In that case, if the distance between the lenses in the lens member is reduced, it is also necessary to reduce the distance between the through-holes in the light-shielding member. However, if the distance between the through-holes is reduced, molding failure may often occur for the light shielding member.

SUMMARY

Aspects of non-limiting embodiments of the present disclosure relate to preventing molding failure for a light transmission-inhibiting structure in contrast to a case where plural through-holes are formed in a light shielding member.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an optical device including: a lens member including plural lenses arranged such that optical axes of the lenses are substantially parallel to one another; and plural column parts that are each provided along the optical axis of each lens among the plural lenses and each allow light to pass through inside, each column part having an outer periphery through which light is less likely to pass from inside to outside the column part than through an end portion of the column part in a direction along the optical axis, the plural column parts being integrally formed and disposed to face the lens member.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the present disclosure will be described in detail with reference to drawings.

Image Forming Apparatus 100

Figure 1:
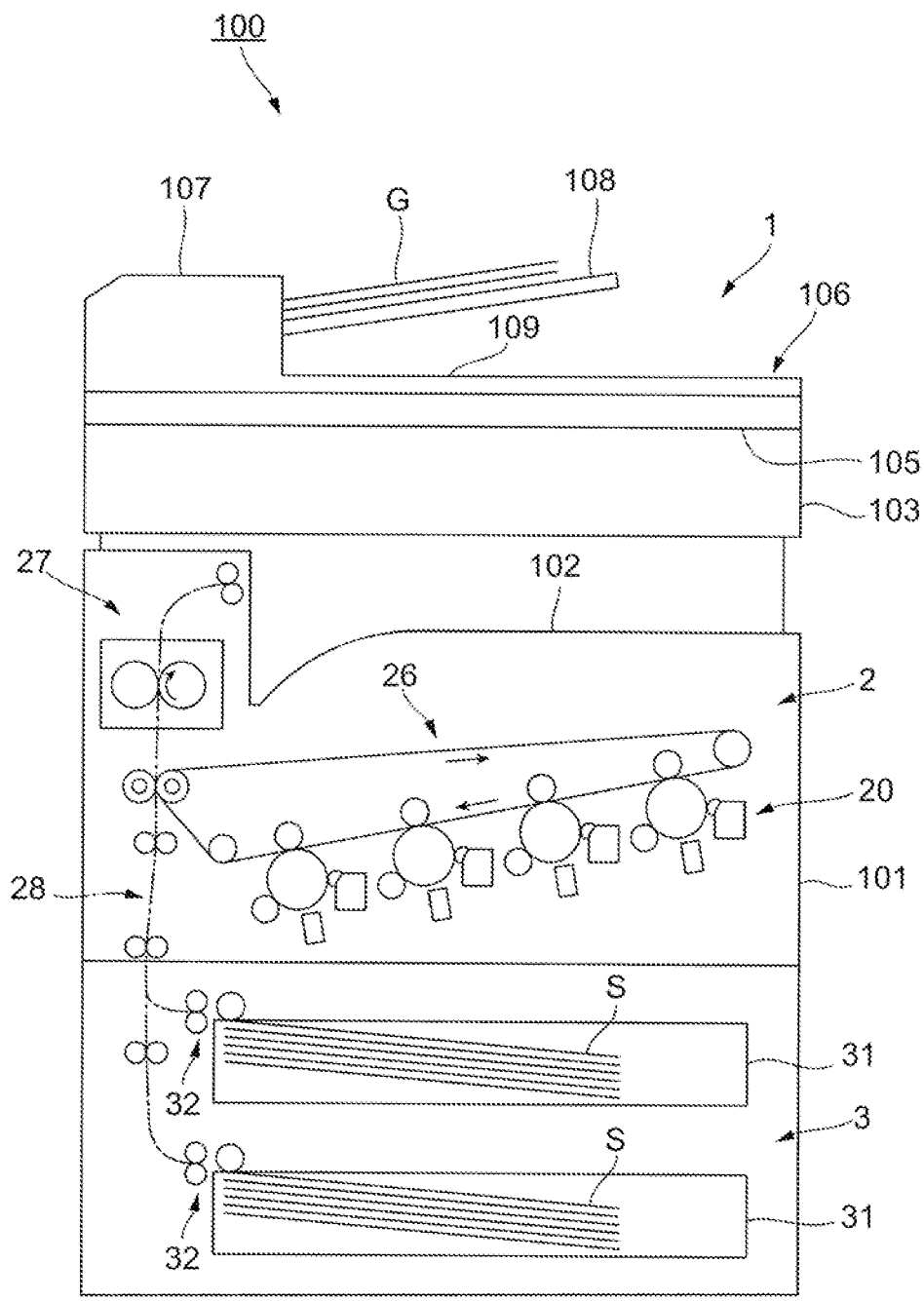
FIG. 1 is a schematic configuration diagram of an image forming apparatus to which the present exemplary embodiment is applied.

FIG. 1 is a schematic configuration diagram of an image forming apparatus 100 to which the present exemplary embodiment is applied.

As shown in FIG. 1, the image forming apparatus 100 includes a document reading device 1 that reads information of a document G, an image forming section 2 that forms an image on a recording sheet S based on the information of the document (read image) read by the document reading device 1, and a paper feeding section 3 that feeds the recording sheet S supplied to the image forming section 2. The image forming apparatus 100 accommodates the image forming section 2 and the paper feeding section 3 in a main body 101, and has the document reading device 1 disposed above the main body 101. The main body 101 has, on an upper surface portion thereof, a discharging and accommodating section 102 that discharges and accommodates the recording sheet S on which an image is formed.

The document reading device 1 has a housing 103. Also, the document reading device 1 has, on the upper surface portion of the housing 103, a light transparent document placing table 105 on which the document G is placed, and a document cover 106 that covers the document placing table 105 and can be opened and closed with respect to the housing 103. On the document cover 106, an auto document feeding section 107 that transports the document G to a reading position and discharges the read document G, a document tray 108 on which the document G transported from the auto document feeding section 107 is placed, and an accommodating section 109 that accommodates the document G discharged from the auto document feeding section 107 are provided.

The image forming section 2 includes an image forming unit 20 that forms toner images having colors of yellow (Y), magenta (M), cyan (C), and black (K), an intermediate transfer unit 26 that transports the toner image formed by the image forming unit 20 to transfer on the recording sheet S, and a fixing unit 27 that fixes the toner image transferred on the recording sheet S by the intermediate transfer unit 26.

The paper feeding section 3 has a drawer type container 31 on which plural recording sheets S that sizes or types thereof are predetermined can be placed, and a feeding device 32 that feeds the recording sheet S accommodated in the container 31 to a transporting path one by one. A supply transporting path 28 through which the recording sheet S fed from the paper feeding section 3 is transported to a secondary transfer position is disposed between the paper feeding section 3 and the image forming section 2.

Next, a basic operation of the image forming apparatus 100 will be described.

First, in the document reading device 1, the document G is placed on any one of the document placing table 105 or the document tray 108 by a user. Then, when the user operates an operation button (not shown) or the like, the document reading device receives an instruction of document reading, then the reading operation with respect to the document G is started. That is, the document reading device 1 acquires reading information of the document G. Then, the image forming section 2 executes the image forming operation based on the reading information of the document G received from the document reading device 1. At this time, the recording sheet S is fed from the paper feeding section 3 in accordance with the operation of the image forming section 2. Then, the recording sheet S is discharged to the discharging and accommodating section 102 after the toner image is fixed to the recording sheet in the image forming section 2. Image forming operations described above are repeated for the number of documents G and the number of image forming sheets in the same manner.

Document Reading Device 1

Figure 2:
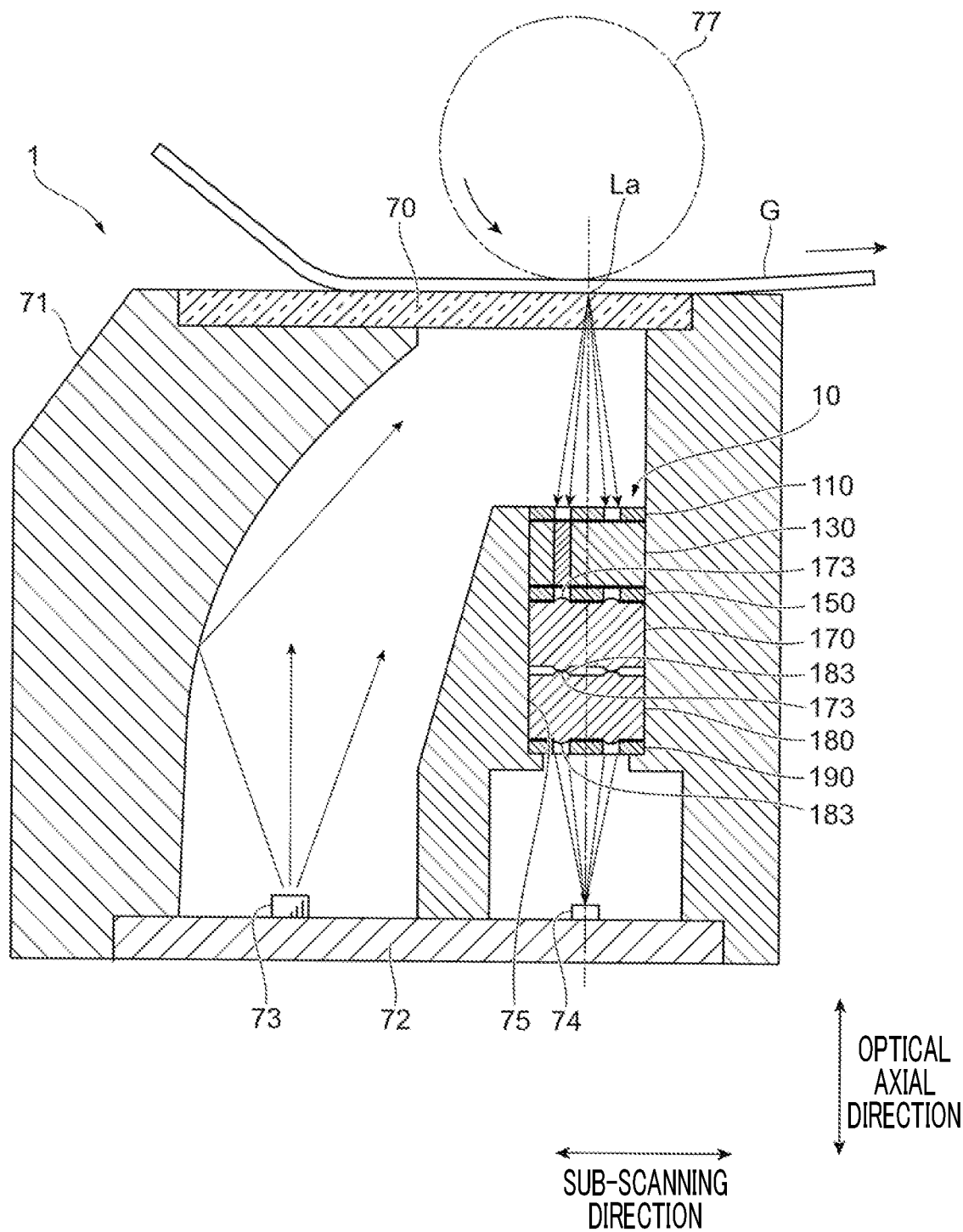
FIG. 2 is a schematic configuration diagram of a document reading device to which the present exemplary embodiment is applied.

FIG. 2 is a schematic configuration diagram of a document reading device 1 to which the present exemplary embodiment is applied.

Next, the document reading device 1 to which the present exemplary embodiment is applied will be described with reference to FIG. 2. As shown in FIG. 2, the document reading device 1 includes a transparent plate 70, a synthetic resin case 71 supporting the transparent plate 70, and a substrate 72 assembled to the bottom of the case 71. On a surface of the substrate 72, plural spot light sources 73 arranged in rows at an interval in a main scanning direction (a direction orthogonal to the paper surface), and plural light receiving elements 74 arranged in the same direction with the plural light sources 73 are provided. Each light source 73 includes a light emitting diode. Each light receiving element 74 has a photoelectric conversion function, and when light is received, the light receiving element 74 outputs a signal of an output level corresponding to the light receiving amount, specifically, outputs an image signal. The light receiving element 74 is an example of the light receiving section.

Here, the document reading device 1 includes a lens array unit 10 between the transparent plate 70 and each light receiving element 74. A detailed configuration of the lens array unit 10 will be described later, the lens array unit 10 as shown is disposed in a recessed groove 75 provided in the case 71. Also, on the surface portion of the transparent plate 70 as shown, a portion facing the lens array unit 10 is an image reading region La extending in the main scanning direction. Light is applied from each light source 73 to the image reading region La.

In the document reading device 1, light from the light source 73 is applied to the document G guided onto the surface of the transparent plate 70 by the auto document feeding section 107 (refer to FIG. 1). The light applied to and reflected from the document G travels toward the lens array unit 10. Then, by acting of the lens array unit 10, the image for one line of the document G in the image reading region La is formed on the plural light receiving elements 74 in an erect equal-magnified manner. Therefore, plural light receiving elements 74 outputs the image signal for one line corresponding to the image of the document G. Such a reading process is repeatedly performed multiple times in the process that the document G is transported by, for example, a platen roller 77 included in the auto document feeding section 107 in a sub-scanning direction.

In the following description, the direction from the image reading region La to the light receiving element 74 (that is, a vertical direction in FIG. 2) may refer to as an optical axial direction.

Lens Array Unit 10

Figure 3:
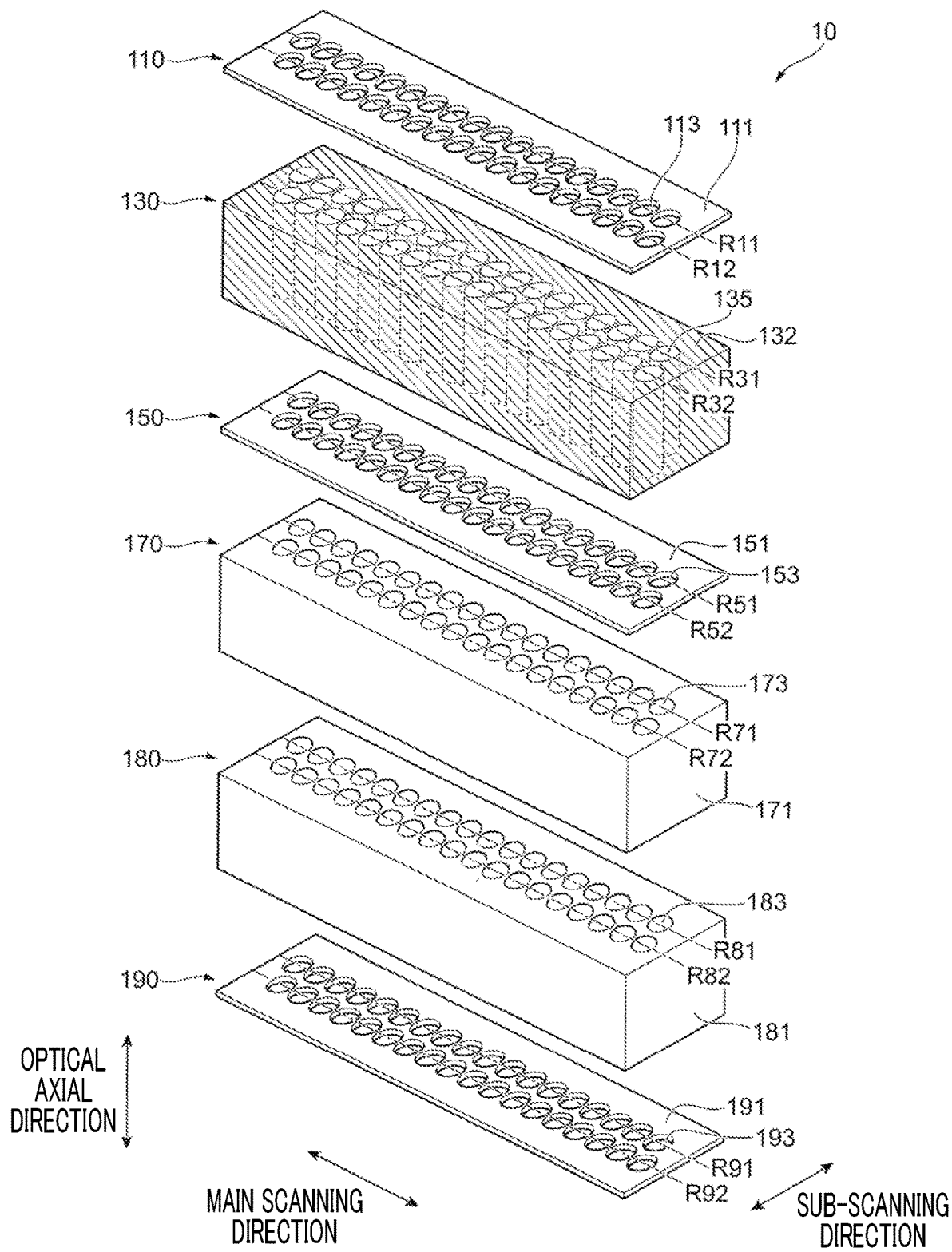
FIG. 3 is an exploded perspective view of a lens array unit to which the present exemplary embodiment is applied.

FIG. 3 is an exploded perspective view of a lens array unit 10 to which the present exemplary embodiment is applied.

Next, the lens array unit 10 to which the present exemplary embodiment is applied will be described with reference to FIG. 3.

As shown in FIG. 3, the lens array unit 10 includes a first light shielding film 110, a light shielding wall 130, a second light shielding film 150, a first lens array 170, a second lens array 180, and a third light shielding film 190. More specifically, in the lens array unit 10 illustrated, the first light shielding film 110, the light shielding wall 130, the second light shielding film 150, the first lens array 170, the second lens array 180, and the third light shielding film 190 are stacked in this order, and are bonded with an adhesive or the like to be integrated with each other. Hereinafter, each of the members included in the lens array unit 10 will be described.

First, the first lens array 170 and the second lens array 180 will be described.

Each of the first lens array 170 and the second lens array 180 is a member having substantially rectangular parallelepiped shape. More specifically, the first lens array 170 and the second lens array 180 as shown are a pair of lens members and have a shape coinciding each other.

The first lens array 170 has a substantially rectangular parallelepiped first support member 171, and plural first lenses 173 formed on the front and back surfaces of the first support member 171. The plural first lenses 173 are arranged such that the optical axes of the lenses are in parallel to each other. Also, the plural first lenses 173 are arranged in a first row R71 and a second row R72 along the main scanning direction. The plural first lenses 173 are disposed in a staggered manner. That is, the first lens 173 which constitutes the first row R71 and the first lens 173 which constitutes the second row R72 are shifted from each other in the main scanning direction. The first lenses 173 in the first row R71 are disposed at a predetermined interval, that is, a predetermined pitch. Also, the first lenses 173 in the second row R72 are disposed at the same intervals as those in the first row R71.

The second lens array 180 has a substantially rectangular parallelepiped second support member 181, and plural second lenses 183 formed on the front and back surfaces of the second support member 181. The plural second lenses 183 are arranged such that the optical axes of lenses are in parallel to each other. Also, the plural second lenses 183 are arranged in the first row R81 and the second row R82 along the main scanning direction. The plural second lenses 183 are disposed in a staggered manner. That is, the second lens 183 which constitutes the first row R81 and the second lens 183 which constitutes the second row R82 are shifted from each other in the main scanning direction. The second lenses 183 in the first row R81 are disposed at predetermined intervals or predetermined pitches. Also, the second lenses 183 in the second row R82 are disposed at the same intervals as those in the first row R81.

In the shown example, the first lens array 170 and the second lens array 180 are disposed such that each of the first lenses 173 and each of the second lenses 183 face each other. More specifically, the optical axis of the first lens 173 and the optical axis of the second lens 183 are aligned to coincide with each other. The first lens array 170 and the second lens array 180 are integrally formed by injection molding, for example, using an optical resin having a light transmitting property. In the following description, if it is unnecessary to distinguish between the optical axis of the first lens 173 and the optical axis of the second lens 183, both may be simply referred to as "an optical axis of the first lens 173".

Next, the first light shielding film 110, the second light shielding film 150, and the third light shielding film 190 will be described. The first light shielding film 110, the second light shielding film 150, and the third light shielding film 190 are an elongated thin plate member. In the shown example, the first light shielding film 110, the second light shielding film 150, and the third light shielding film 190 are shaped to coincide each other.

The first light shielding film 110 has a first plate surface 111 having a substantially rectangular shape in a plan view. Plural first through-holes 113 are formed in the first plate surface 111. Here, each first through-hole 113 is substantially circular. A position of each first through-hole 113 corresponds to the first lens 173 and the second lens 183. That is, each first through-hole 113 is formed at a position where the optical axis of the first lens 173 passes. Also, the first through-holes 113 are arranged in the first row R11 and the second row R12 along the main scanning direction.

In the shown example, the first light shielding film 110 has a thickness thinner than that of the light shielding wall 130. That is, the first light shielding film 110 has a smaller dimension in the optical axial direction than the light shielding wall 130. Further, the first light shielding film 110 is formed of resin materials mixed with black pigment (for example, an acrylic resin). The first light shielding film 110 blocks light not contributing to focusing by the first lens 173 and second lens 183. More specifically, the first light shielding film 110 is provided on a side opposite to the first lens 173 and the second lens 183 in the optical axial direction with the light shielding wall 130 interposed therebetween, in other words, on the upper surface of the light shielding wall 130, and shields a part of light directed to the light shielding wall 130.

As described above, the first light shielding film 110, the second light shielding film 150, and the third light shielding film 190 are shaped to coincide each other. Although a detailed description will be omitted, therefore, the second light shielding film 150 has a second plate surface 151 in which plural second through-holes 153 are formed. Here, each second through-hole 153 is formed at a position where the optical axis of the first lens 173 passes. Also, the second through-holes 153 are provided in the first row R51 and the second row R52.

The third light shielding film 190 has a third plate surface 191 in which plural third through-holes 193 are formed. Here, each third through-hole 193 is formed at a position where the optical axis of the first lens 173 passes. Also, the third through-holes 193 are provided in the first row R91 and the second row R92.

Light Shielding Wall 130

Figure 4A:
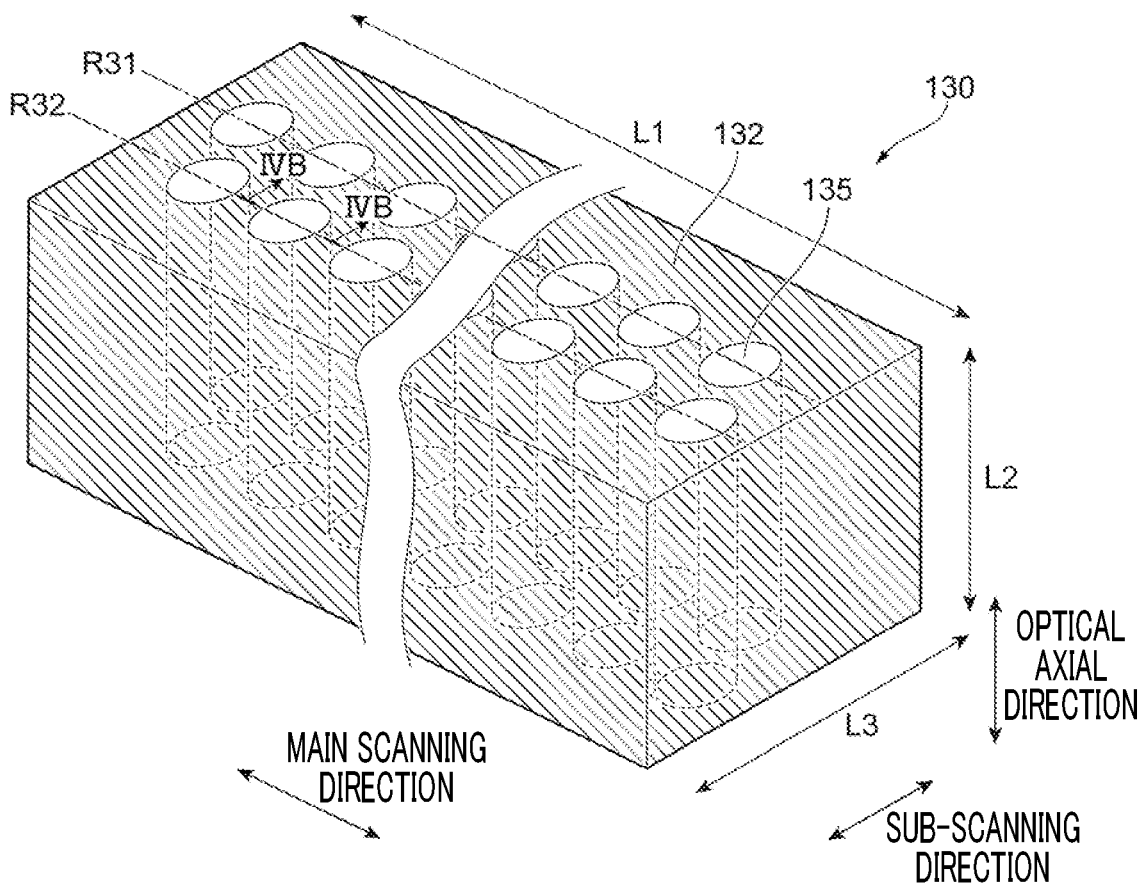
FIGS. 4A and 4B are configuration diagrams of a light shielding wall.
Figure 4B:
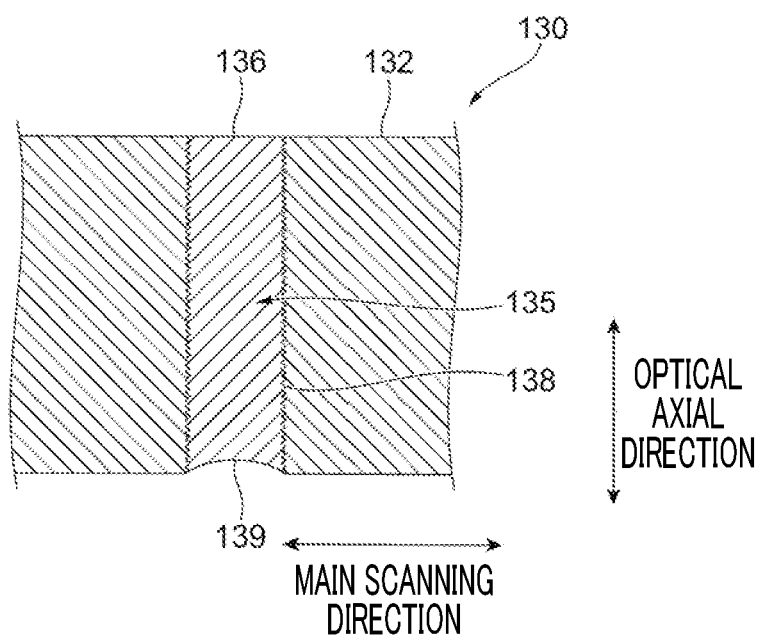

FIGS. 4A and 4B are configuration diagrams of a light shielding wall 130. More specifically, FIG. 4A is a perspective view of the light shielding wall 130, and FIG. 4B is a cross-sectional view taken along IVB-IVB of FIG. 4A.

Next, the light shielding wall 130 will be described with reference to FIGS. 4A and 4B.

As shown in FIGS. 4A and 4B, the light shielding wall 130 has a substantially rectangular parallelepiped base body 132, and the plural column parts 135 provided to penetrate the base body 132 in the optical axial direction.

The base body 132 is a substantially rectangular parallelepiped member whose longitudinal direction is disposed along a main scanning direction. The base body 132 is formed of a resin material mixed with black pigment (for example, an acrylic resin). The base body 132 shields light not contributing to the focusing by the first lens 173 and the second lens 183. The base body 132 has a length L1 in the main scanning direction of 300 mm, a length L2 in the optical axial direction of 2.5 mm, and a length L3 in the sub-scanning direction of 4 mm.

The column part 135 is a column shaped member whose longitudinal direction is disposed along the optical axial direction. The shown column part 135 is a substantially cylindrical member. Each column part 135 is disposed at a position where the optical axis of the first lens 173 passes. More specifically, each column part 135 is disposed perpendicularly to the first lens 173. The shown column part 135 is arranged in the first row R31 and the second row R32 along the main scanning direction in the base body 132. Also, the interval, which is a pitch, of each column part 135 in the first row R31 and the second row R32 coincides with the pitch of the first lens 173. The shown column part 135 is integrally formed by the base body 132.

The column part 135 is made of the same material as the first lens array 170 and the second lens array 180. Specifically, the column part 135 is formed of a material transparent to light from the light source 73 (see FIG. 2), such as glass or acrylic resin. The same material refers to the common composition except for impurities.

Further, unlike the so-called SELFOC (registered trademark) lens having a refractive index distribution, the column part 135 has no refractive index distribution inside. More specifically, the column part 135 does not have a refractive index distribution with respect to the refractive index of the first lens array 170 and the second lens array 180. Further, the refractive index on the center side of the column part 135 matches the refractive index on the outer peripheral side of the column part 135. In addition, light passing through the column part 135 along the optical axial direction does not converge inside the column part 135. A case of "light does not converge" includes a case where there is no refractive index distribution or a case where the column part is a transparent body.

Here, as shown in FIG. 4B, a first end surface 136 of the column part 135 facing the first light shielding film 110 (see FIG. 3) side is flat. That is, the first end surface 136 has a shape along the surface of the base body 132. Meanwhile, a second end surface 139 facing the first lens array 170 (see FIG. 3) side is a bent recessed portion. That is, the second end surface 139 has a shape recessed from the surface of the base body 132. The illustrated second end surface 139 has a shape along the curved surface of the first lens 173 (see FIG. 3).

The outer peripheral surface 138 of the column part 135 is made rougher than the first end surface 136 and the second end surface 139. Although details will be described later, the outer peripheral surface 138 of the column part 135, which is a rough surface, scatters light obliquely incident on the outer peripheral surface 138 and inhibits regular reflection.

Disposition of Light Shielding Wall 130

Figure 5:
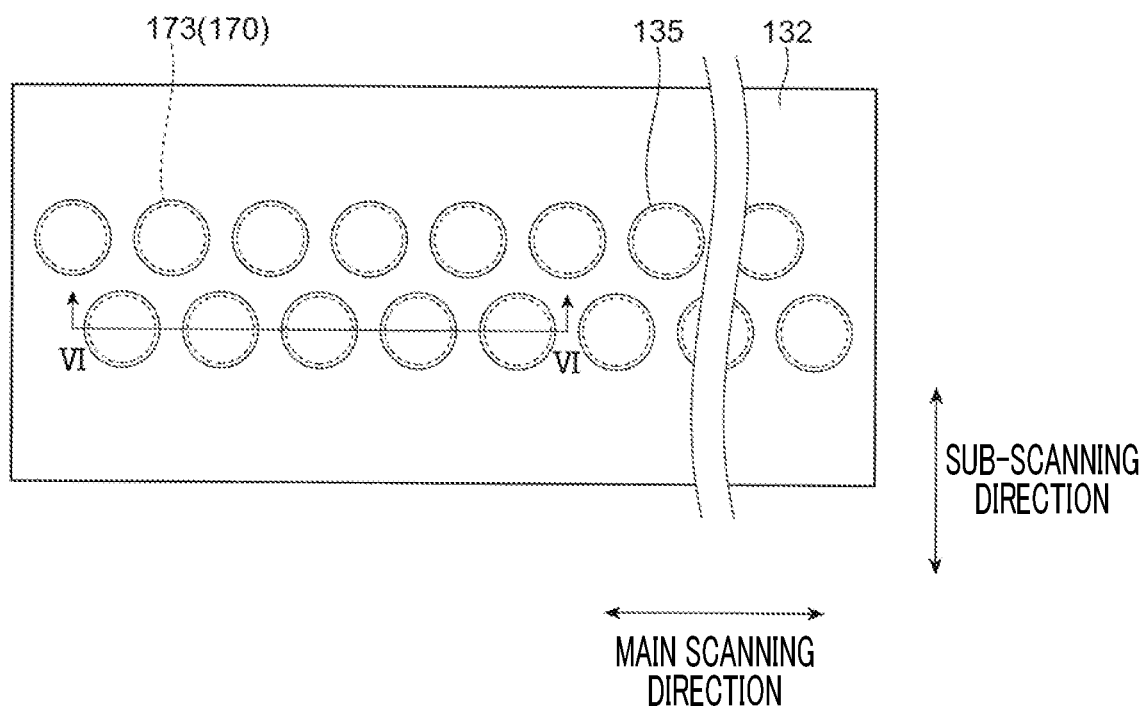
FIG. 5 is a top view of the light shielding wall fixed to the first lens array.

FIG. 5 is a top view of the light shielding wall 130 fixed to the first lens array 170.

Figure 6:
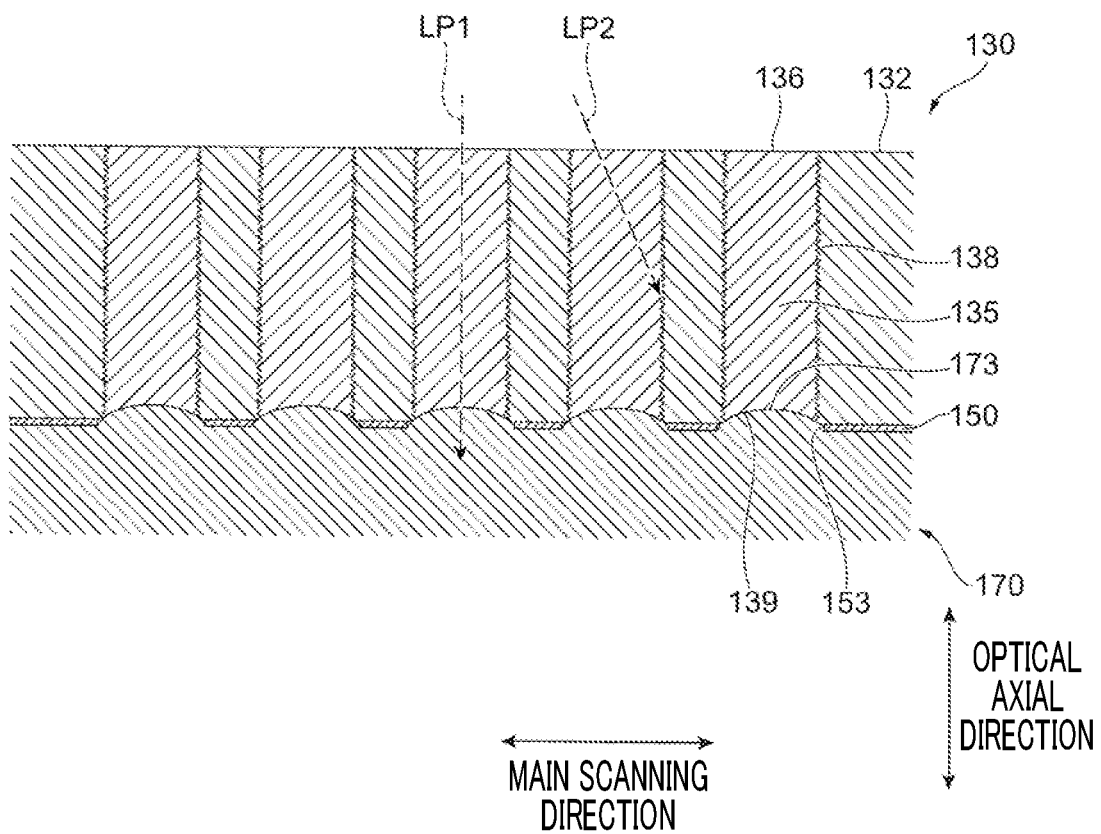
FIG. 6 is a cross-sectional view taken along VI-VI in FIG. 5.

FIG. 6 is a cross-sectional view taken along VI-VI in FIG. 5.

Next, the disposition of the light shielding wall 130 with respect to the first lens array 170 will be described with reference to FIGS. 5 and 6.

As shown in FIG. 5, when the light shielding wall 130 fixed to the first lens array 170 is viewed in the optical axial direction, each of column parts 135 is disposed at a position overlapping the first lens 173. The column part 135 disposed in this manner transmits light traveling along the optical axis of the first lens 173. More specifically, as shown in FIG. 6, light incident from the first end surface 136 travels in the column part 135 along the optical axial direction and is emitted from the second end surface 139 to the first lens 173 (see light LP1 in FIG. 6).

The light shielding wall 130 shields light not contributing to the focusing by the first lens 173 and the second lens 183. More specifically, the outer periphery of the column part 135 is surrounded by the base body 132 that is made of a black resin and less likely to transmit light than the column part 135. Therefore, when light travels in a direction crossing the optical axial direction inside the column part 135 (refer to light LP2 in FIG. 6), light LP2 is restricted to reach the optical axis adjacent in the main scanning direction by the base body 132.

Further, the surface roughness of the outer peripheral surface 138 of the column part 135 is rougher than that of the first end surface 136 or the like. Accordingly, light LP2 directed outward from the column part 135 is prevented from being regularly reflected on the outer peripheral surface 138, which is the interface between the column part 135 and the base body 132. The surface roughness defines the roughness of the surface, for example, is an arithmetic mean roughness (Ra) of the roughness curve defined in Japanese Industrial Standards (JIS).

Accordingly, field angles of the first lens 173 and the second lens 183 are narrowed, and the focal depth can be increased. Also, stray light may be less likely to occur in light passing through the first lens 173 and the second lens 183. Here, the field angle is a perspective angle of the ray of light with respect to the optical axial direction (an angle formed by the normal line and the ray of light). Further, stray light is light that the ray of light emitted from an object point of an object surface (that is, the image reading region La) reaches the position other than the image point corresponding on the image surface (that is, the light receiving element 74).

In general, if the lens pitch in the first lens array 170 and the second lens array 180, that is, the interval in the first lens 173 and the second lens 183 in the main scanning direction is narrowed, the optical performance of the first lens array 170 and the second lens array 180 is improved, for example, the light quantity of light reaching the light receiving element 74 increases (refer to FIG. 2).

Unlike the present exemplary embodiment, for example, the light shielding wall 130 may be formed in one rectangular shape and plural through-holes (not shown) may be formed at positions corresponding to the optical axes of the first lenses 173. However, when such a structure is adopted, for example, the wall thickness between the through-holes will be thinner as the distance between the through-holes (not shown) of the light shielding wall 130 is reduced in accordance with a narrow lens pitch in the first lens array 170 and the second lens array 180. If the wall thickness is made smaller than a predetermined thickness, such as 150 μm or less, the fluidity of the resin material during injection molding may be poor in the thin portion, so that molding failure may occur.

In contrast, even when the interval between the column parts 135 is made small, the structure having the plural column parts 135 as in the light shielding wall 130 in the present exemplary embodiment can be manufactured by the manufacturing method illustrated in FIGS. 8A to 8D. Therefore, the molding failure described above can be prevented for the light shielding wall 130 in the present exemplary embodiment.

As shown in FIG. 6, the light shielding wall 130 is provided in contact with the first lens array 170. More specifically, the second end surface 139 of the column part 135 is provided to be in contact with the outer peripheral surface of the first lens 173 of the first lens array 170. Further, as described above, the column part 135 and the first lens array 170 are formed of the same material. Accordingly, even when the humidity or temperature changes, the change in the optical performance of the lens array unit 10 can be reduced.

In addition, since the column part 135 and the first lens array 170 are made of the same material, it is possible to prevent the loss of light between the column part 135 and the first lens 173. As described above, the prevention of the loss of light by the light shielding wall 130 can prevent the loss of light information in the lens array unit 10. Further, when the column part 135 and the first lens 173 are made of the same material, the manufacturing cost of the light shielding wall 130 can be reduced.

Modification Example

Figure 7A:
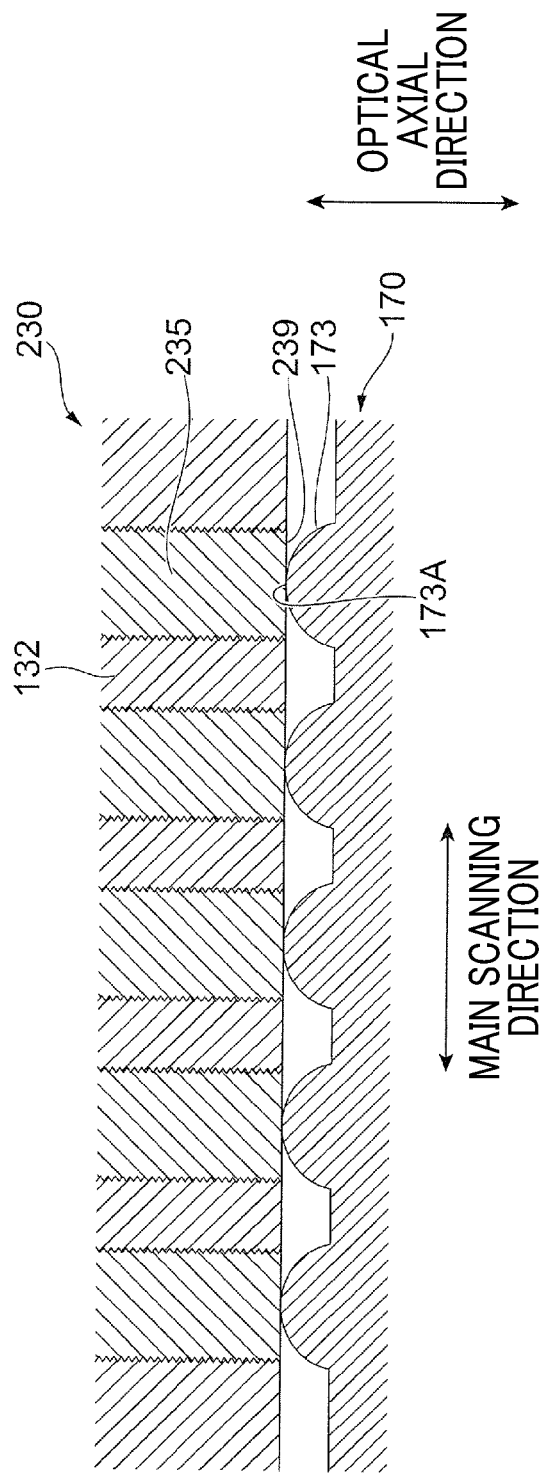
FIGS. 7A and 7B are diagrams for explaining a modification example of the light shielding wall.
Figure 7B:
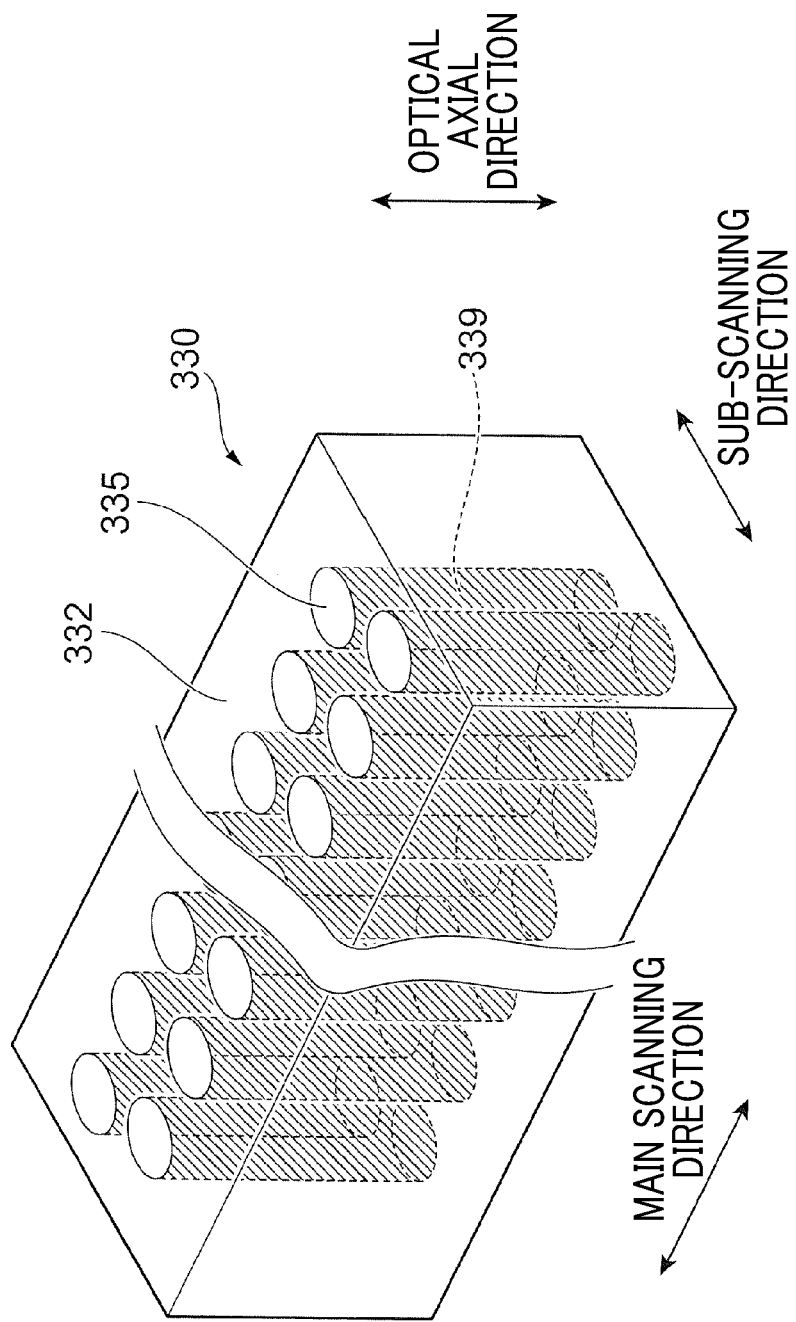

FIGS. 7A and 7B are diagrams for explaining a modification example of the light shielding wall 130. More specifically, FIG. 7A is a cross-sectional view of a light shielding wall 230 and the first lens array 170 in the modification example and FIG. 7B is a perspective view of a light shielding wall 330 in another modification example.

A modification example of the light shielding wall 130 will be described with reference to FIGS. 7A and 7B. In the following description, the same components as the above exemplary embodiment may be assigned the same reference numerals and the description may be omitted.

In the above description, the second end surface 139 of the column part 135 is a recessed portion, but it is not limited thereto. For example, as the column part 235 shown in FIG. 7A, the second end surface 239 may be flat. In the shown example, the second end surface 239 is provided in contact with an apex 173A of the first lens 173.

In the above description, the base body 132 supporting the column part 135 is black, which is non-limiting. Any other feature may be provided as long as it inhibits travel of light from the inside of the column part 135 in a direction intersecting the optical axial direction. For example, as shown in FIG. 7B, a light shielding film 339 made of light-shielding resin or the like may be provided on the outer periphery of a light guide body 335. In the example shown in FIG. 7B, the base body 332 is made of a transparent resin material. More specifically, when the base body 332 and the column part 135 or the first lens 173 are made of the same material, the manufacturing cost of the light shielding wall 130 can be reduced.

Manufacturing Process

FIGS. 8A to 8D are diagrams for explaining a manufacturing process of the light shielding wall 430.

Next, a structure of the light shielding wall 430 and a manufacturing process of the light shielding wall 430 (see FIG. 8D) in another modification example will be described with reference to FIGS. 8A to 8D.

In the above description, the base body 132 of the light shielding wall 130 is formed of resin materials mixed with black pigment, but it is not limited thereto. A configuration thereof is not particularly limited as long as the column part 135 is supported and light emitted from the outer periphery of the column part 135 is blocked. For example, as the light shielding wall 430 shown in FIG. 8D, the base body 432 may include plural members. That is, the base body 432 may include a first plate 431A and a second plate 431B which are made of fiber-reinforced plastics (FRP), and a filler 431C, such as silicone, which fills the space between the first plate 431A and the second plate 431B.

Next, the manufacturing process of the light shielding wall 430 will be described.

Figure 8A:
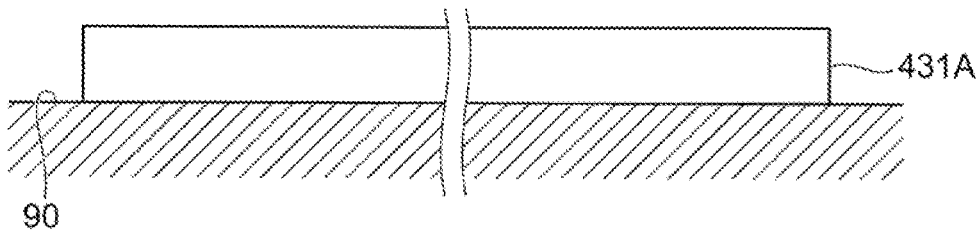
FIGS. 8A to 8D are diagrams for explaining a manufacturing process of the light shielding wall.

First, as shown in FIG. 8A, the first plate 431A is placed on a support 90.

Figure 8B:
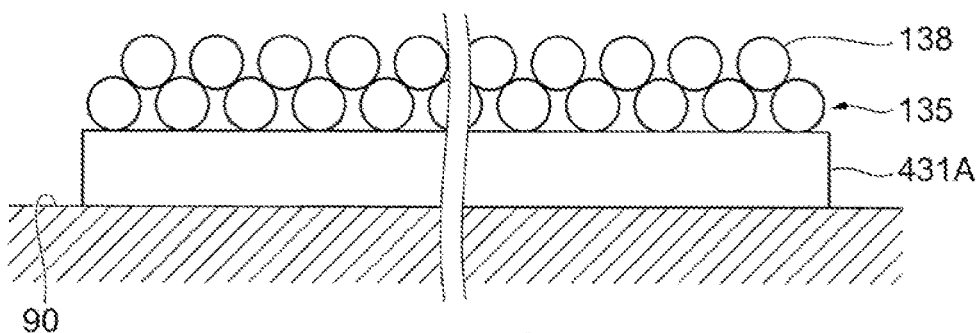

As shown in FIG. 8B, the column part 135 that is formed in fiber-shaped on the first plate 431A is loaded to be arranged in two layers in the illustrated example. The outer peripheral surface 138 of the column part 135 is roughened in advance by, for example, etching or blasting.

Figure 8C:
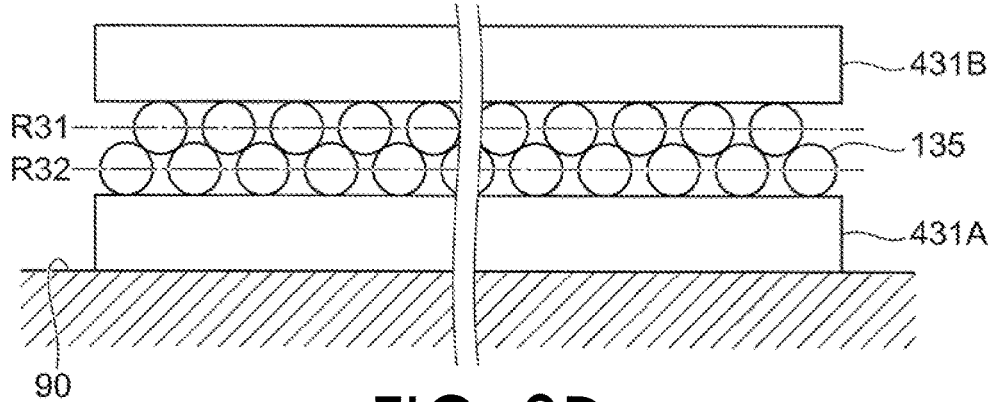

Next, as shown in FIG. 8C, the second plate 431B is placed on the column part 135 stacked in two layers.

Figure 8D:
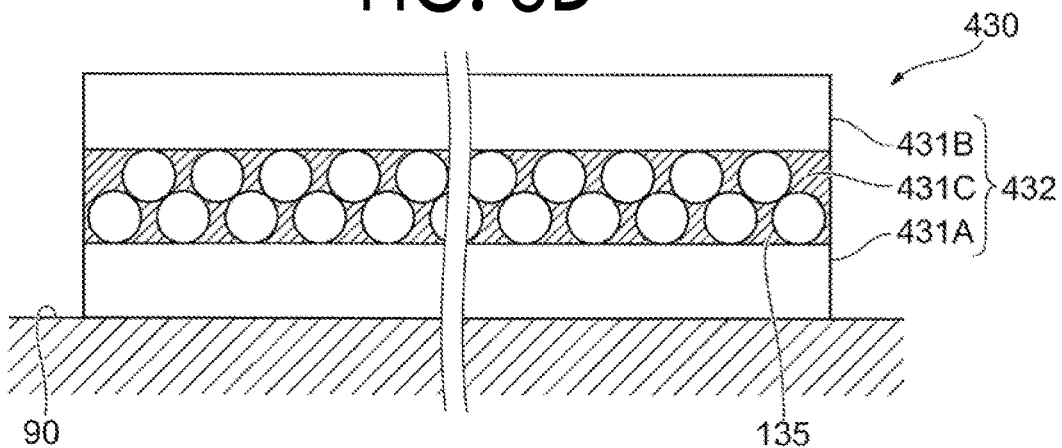

As shown in FIG. 8D, the filler 431C is filled between the first plate 431A and the second plate 431B. At this time, the outer periphery of the column part 135 is surrounded by the filler 431C. As a result, the base body 432 including the first plate 431A, the second plate 431B, and the filler 431C supports the column part 135.

In addition, although not described above, each member shown in FIGS. 8A to 8D is elongated in the depth direction with respect to the plane of the drawing sheet in order to increase the efficiency of production of the light shielding wall 430. Specifically, a length of each member in the depth direction in FIGS. 8A to 8D is longer by multiple times a length of each member in the optical axial direction in FIG. 4A. As shown in FIG. 8D, the column part 135 is fixed by the base body 432, and then is cut at a predetermined length in the depth direction of the paper surface. As a result, the plural light shielding walls 431 can be efficiently produced.

As a manufacturing method different from the above description, for example, a method of forming the through-hole in the base body 132 formed in substantially rectangular parallelepiped shape, and inserting the column part 135 into the through-hole may be adopted. As compared with the manufacturing method of inserting the column part 135, in the manufacturing method shown in FIGS. 8A to 8D, for example, a step of inserting the column part 135 into the through-hole is not required, manufacturing of the light shielding wall 130 becomes easier.

Modification Example of First Light Shielding Film 110

FIGS. 9A to 9D are diagrams for explaining a modification example of a first light shielding film 110.

A modification example of the first light shielding film 110 will be described with reference to FIGS. 9A to 9D. In the above description, the first light shielding film 110 (refer to FIG. 9A) has the substantially circular first through-hole 113 formed in the first plate surface 111 having a substantially rectangular shape in a plan view, but is not limited thereto. If the first light shielding film 110 is provided on the side opposite to the first lens 173 and the second lens 183 with the light shielding wall 130 interposed therebetween in the optical axial direction, and shields the part of light directed to the light shielding wall 130, the shape thereof is not particularly limited.

Figure 9A:
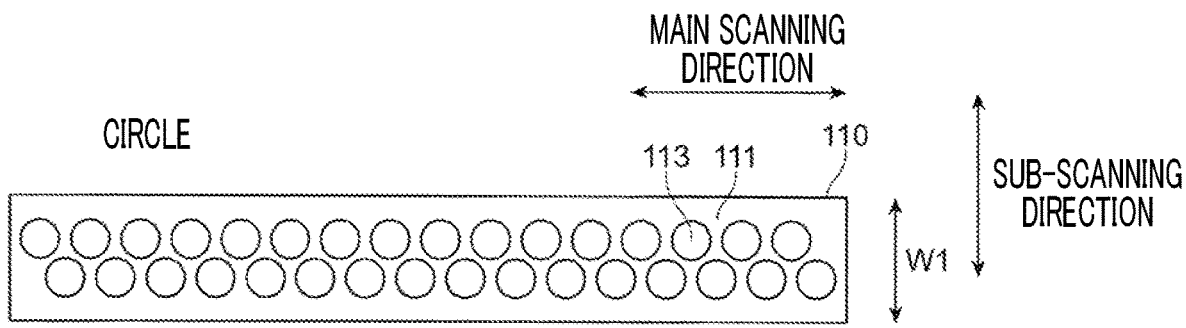
FIGS. 9A to 9D are diagrams for explaining a modification example of a first light shielding film.
Figure 9B:
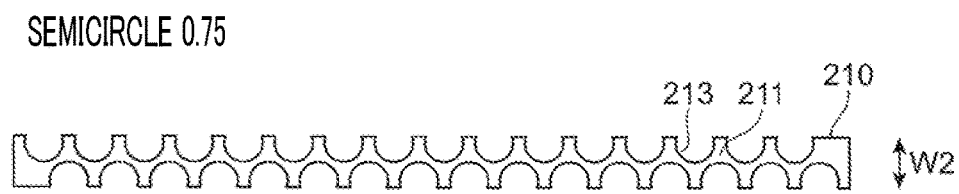

For example, as the first light shielding film 210 shown in FIG. 9B, a configuration having a substantially semicircular first through-hole 213 formed in the first plate surface 211 having a substantially rectangular shape in a plan view may be adopted. The first light shielding film 210 shown in FIG. 9B can be regarded as a shape that both ends of the first light shielding film 110 (see FIG. 9A) in the width direction is cut off. For example, the length W1 in the width direction of the first light shielding film 110 is 2 mm, the length W2 in the width direction of the first light shielding film 210 is 0.75 mm.

Figure 9C:
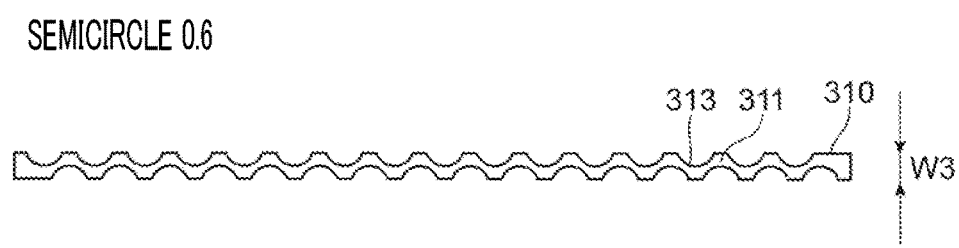

Also, as the first light shielding film 310 shown in FIG. 9C, a configuration having the first through-hole 313 formed in the first plate surface 311 having a substantially rectangular shape in a plan view may be adopted. The first through-hole 313 has a substantially semicircular shape, more specifically, a so-called arch shape formed by a circular arc and chord occupying narrower region than the semicircle. The first light shielding film 310 shown in FIG. 9C can be regarded as a shape that both ends of the first light shielding film 110 (see FIG. 9A) in the width direction is cut off. For example, the length W1 in the width direction of the first light shielding film 110 is 2 mm, the length W3 in the width direction of the first light shielding film 310 is 0.6 mm.

Figure 9D:

Also, as the first light shielding film 410 shown in FIG. 9D, the first light shielding film may have a substantially rectangular shape in a plan view. That is, a configuration not having the first through-hole 113 (see FIG. 9A) may be adopted. The first light shielding film 410 is regarded as an elongate member disposed between the first row R71 and the second row R72 of the first lens 173 in the sub-scanning direction along the first row R71 and the second row R72. For example, the length W4 in the width direction of the first light shielding film 410 is 0.18 mm.

Figure 10A:
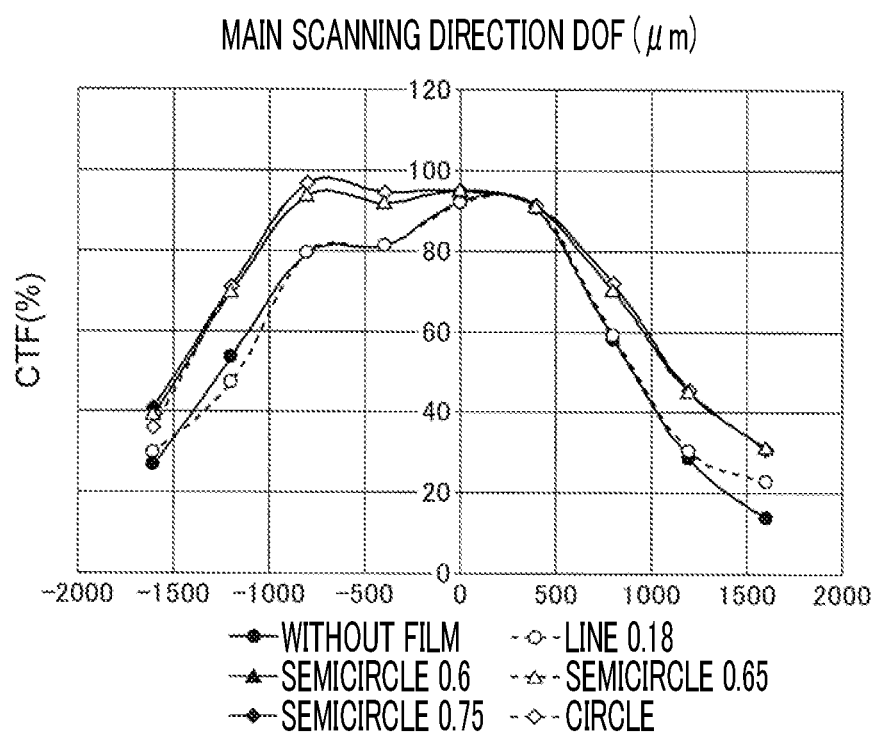
FIGS. 10A and 10B are diagrams showing a result of simulation that a shape of the first light shielding film is changed.
Figure 10B:
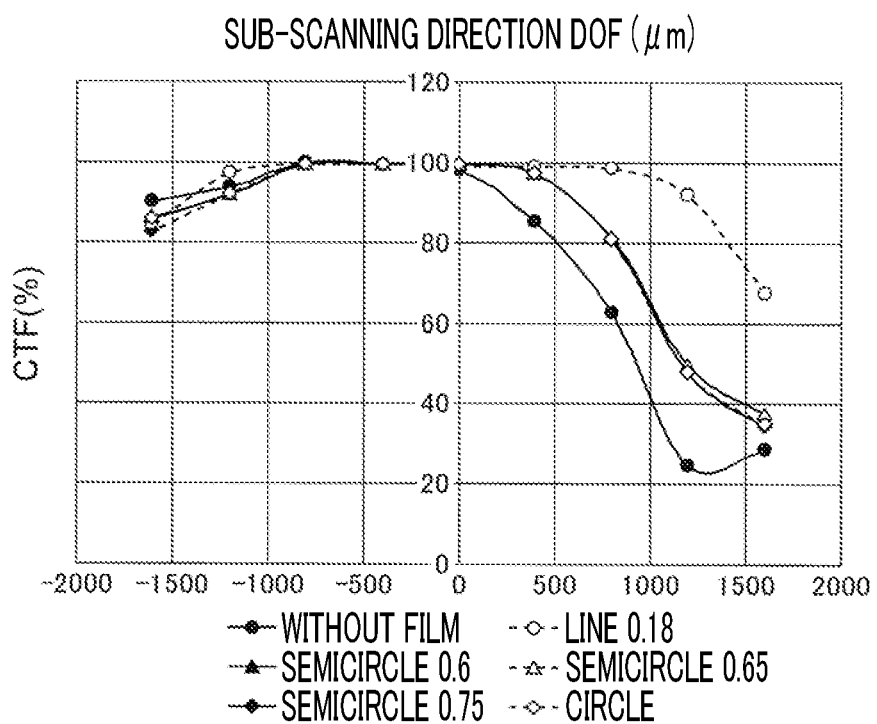

FIGS. 10A and 10B are diagrams showing a result of simulation that a shape of the first light shielding film 110 is changed. More specifically, FIG. 10A is a diagram showing a result of simulation of a relationship between the focal depth in the main scanning direction and the resolution (contrast transfer function: CTF) when the shape of the first light shielding film 110 is changed. FIG. 10B is a diagram showing a result of simulation of a relationship between the focal depth in the sub-scanning direction and the resolution when the shape of the first light shielding film 110 is changed.

Incidentally, the resolution in FIGS. 10A and 10B is a relative value of the density contrast of the read image on the document G in a case where the density contrast of the line image data to be written is 100%. A condition of the simulation is that first light shielding film 110 or the like of each shape is disposed on the stacked body in which the light shielding wall 130, the second light shielding film 150, the first lens array 170, the second lens array 180, and the third light shielding film 190 are stacked in this order, as the lens array unit 10 shown in FIG. 2.

Note that "semicircle 0.6" refers a shape in which both sides of the first light shielding film 110 in the sub-scanning direction are cut off and the length in the width direction of the first light shielding film is 0.6 mm. Further, for comparison, a condition not providing the first light shielding film 110 is "without film". Also, "line 0.18" is the first light shielding film 410 in FIG. 9D, "semicircle 0.6" is the first light shielding film 310 in FIG. 9C, "semicircle 0.75" is the first light shielding film 210 in FIG. 9B, and "circle" is the first light shielding film 110 in FIG. 9A.

A simulation result when the shape of the first light shielding film 110 is changed will be described with reference to FIGS. 9A to 9D and FIGS. 10A and 10B.

As shown in FIGS. 10A and 10B, regarding the above first light shielding film 110, 210, 310, and 410, and the first light shielding film of "semicircle 0.65" (not shown), the relationship between the focal depth in the main scanning direction and the resolution, and the relationship between the focal depth in the sub-scanning direction and the resolution are respectively simulated.

According to FIGS. 10A and 10B, greater resolution is obtained in "line 0.18", "semicircle 0.6", "semicircle 0.65", "semicircle 0.75", and "circle" as compared to "without film". That is, it is confirmed that the optical performance of the lens array unit 10 is improved by disposing the first light shielding film 110 or the like. Incidentally, in the first light shielding film 410 which is "line 0.18", the resolution in the sub-scanning direction shown in FIG. 10B is greater as compared to "without film".

Other Modification Examples

In the above description, the column part 135 is cylindrical, but the sectional shape is not limited thereto as long as a member extends along the optical axial direction. Therefore, the column part 135 may be a square column. The sectional shape of the column part 135 may be an elliptic, triangle, or other shapes such as a polygon.

In the above description, it has been described that the column part 135 and the first lens 137 are provided in contact with each other, but it is not limited thereto as long as the column part 135 and the first lens 137 are provided along the optical axial direction. For example, the column part 135 and the first lens 137 may be provided to be separated from each other. Further, although it has been described that the column part 135 and the first lens 137 are the same material, they may be different materials.

In addition, an antireflection film scattering excessive light may be provided on a surface of the light shielding wall 130 on the first light shielding film 110 side (refer to FIG. 3) and a surface supporting the outer periphery of the column part 135, that is, an inner surface. Also, the surface and the inner surface of the light shielding wall 130 may be roughened.

In the above description, it has been described that the outer peripheral surface 138 of the column part 135 is the rough surface, but the outer peripheral surface is formed to have the same surface roughness as the first end surface 136 and the second end surface 139 without being roughened.

In the above description, it has been described that the first lens array 170 has plural first lenses 173 arranged in plural rows of the first row R71 and the second row R72, but it is not limited thereto. For example, the first lens array 170 may be formed to have the first lenses 173 in one row. Incidentally, in this configuration, the light shielding wall 130 has an aspect that the column parts 135 are arranged in a row in the main scanning direction.

In the above description, the first light shielding film 110 is provided, but it is not limited the film-like shape or materials. For example, the first light shielding film 110 may include a plate-shaped member having higher rigidity than that of the film. That is, a configuration having a light shielding plate instead of the first light shielding film 110 may be adopted. Furthermore, a configuration not having the first light shielding film 110 may be adopted.

The lens array unit 10 is described to be provided in the document reading device 1, but is not limited thereto. For example, the lens array unit 10 may be provided to the optical device other than the document reading device 1 such as an imaging device that images light emitted from light emitting diode on the image holding member.

The first lens 173 described above is an example of the lens member. The first end surface 136 is an example of the end portion. The outer peripheral surface 138 is an example of the outer periphery. The second end surface 139 is an example of the recessed portion. The base body 132 is an example of the light transmission-inhibiting part and the column support member. The first light shielding film 110 is an example of the cover part. The first through-hole 113 is an example of the passing region. The light source 73 is an example of the irradiation section. The light receiving element 74 is an example of the light receiving element. The document reading device 1 is an example of the image reading device.

In above, various exemplary embodiments and modification examples are described, but they may be formed by combining these exemplary embodiments and modification examples to each other.

The present disclosure is not limited to the above exemplary embodiments and may be implemented in various forms without departing from the scope of the present disclosure.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An optical device comprising:
   a first lens member including a plurality of first lenses arranged such that optical axes of the first lenses are substantially parallel to one another;
   a second lens member including a plurality of second lenses arranged such that optical axes of the second lenses are substantially parallel to one another;
   a plurality of column parts that are each provided along the optical axis of each lens among the plurality of first lenses and each allow light to pass through inside; and,
   a light receiving section that receives light passing through the lens member, wherein:
   each column part has an outer periphery through which light is less likely to pass from inside to outside the column part than through an end portion of the column part in the direction along the optical axis,
   the plurality of column parts are integrally formed and disposed to face the first lens member, and
   the plurality of column parts, the first lens member, the second lens member and the light receiving section are disposed, in this order, along the optical axis.

2. The optical device according to claim 1, wherein
light traveling along the optical axis in an inside of the column part does not converge in the inside of the column part.

3. The optical device according to claim 2, wherein
the column part, the first lens member and the second lens member have a common composition except for impurities.

4. The optical device according to claim 3, wherein
the column part has an end portion positioned in contact with the first lens member.

5. The optical device according to claim 4, wherein
the column part has a recessed portion that is provided in the end portion and along an outer periphery of the first lens member and positioned in contact with the outer periphery of the first lens member.

6. The optical device according to claim 1, wherein
the outer periphery of the column part has a rough surface rougher than the end portion, and
the rough surface is covered with a light transmission-inhibiting part that inhibits transmission of light from inside to outside the column part.

7. The optical device according to claim 6, further comprising:
a column support member that supports the plurality of column parts and is less likely to transmit light than the plurality of column parts.

8. The optical device according to claim 1, further comprising:
a cover part that is provided on a side opposite to the first lens member with the plurality of column parts interposed therebetween in the direction along the optical axis of the plurality of first lenses, covers the plurality of column parts, and has a passing region through which light passes on the optical axis of each of the plurality of first lenses.

9. The optical device according to claim 8, wherein
the cover part is thinner than the plurality of column parts in the direction along the optical axis of the plurality of first lenses.

10. An image reading device comprising:
an irradiation section that irradiates a document with light;
a first lens member including a plurality of first lenses that are arranged such that optical axes of the first lenses are substantially parallel to one another and through which light reflected from the document passes;
a second lens member including a plurality of second lenses arranged such that optical axes of the second lenses are substantially parallel to one another;
a plurality of column parts that are each provided along the optical axis of each lens among the plurality of first lenses and each allow light to pass through inside, each column part having an outer periphery through which light is less likely to pass from inside to outside the column part than through an end portion of the column part in the direction along the optical axis; and
a light receiving section that receives light passing through the plurality of first lenses and the plurality of second lenses, wherein
the plurality of column parts are integrally formed and disposed to face the first lens member, and
the plurality of column parts, the first lens member, the second lens member and the light receiving section are disposed, in this order, along the optical axis.

11. An image forming apparatus comprising:
an irradiation section that irradiates a document with light;
a first lens member including a plurality of lenses that are arranged such that optical axes of the first lenses are substantially parallel to one another and through which light reflected from the document passes;
a second lens member including a plurality of second lenses arranged such that optical axes of the second lenses are substantially parallel to one another;
a plurality of column parts that are each provided along the optical axis of each lens among the plurality of first lenses and each allow light to pass through inside, each column part having an outer periphery through which light is less likely to pass from inside to outside the column part than through an end portion of the column part in the direction along the optical axis;
a light receiving section that receives light passing through the plurality of first lenses and the plurality of second lenses; and
an image forming section that forms an image based on light received by the light receiving section, wherein
the plurality of column parts are integrally formed and disposed to face the first lens member, and
the plurality of column parts, the first lens member, the second lens member and the light receiving section are disposed, in this order, along the optical axis.

* * * * *